United States Patent
Ayers et al.

(10) Patent No.: US 12,067,212 B2
(45) Date of Patent: Aug. 20, 2024

(54) DYNAMICALLY REPLACING INTERACTIVE CONTENT OF A QUICK SETTING BAR

(71) Applicant: Digital Turbine, Inc., Austin, TX (US)

(72) Inventors: Brandon Brent Ayers, Austin, TX (US); Kevin McGuire, Fairfax, VA (US); Jonathan James Kittrell, Washington D.C., DC (US)

(73) Assignee: Digital Turbine, Inc., Austin, TX (US)

( * ) Notice: Subject to any disclaimer, the term of this patent is extended or adjusted under 35 U.S.C. 154(b) by 0 days.

(21) Appl. No.: 16/939,136

(22) Filed: Jul. 27, 2020

(65) Prior Publication Data

US 2022/0027020 A1  Jan. 27, 2022

(51) Int. Cl.
  *G06F 3/0482* (2013.01)
  *G06F 3/04842* (2022.01)
  *G06F 3/04886* (2022.01)
  *G06F 11/34* (2006.01)
  *H04L 67/50* (2022.01)

(52) U.S. Cl.
  CPC ........ *G06F 3/0482* (2013.01); *G06F 3/04842* (2013.01); *G06F 3/04886* (2013.01); *G06F 11/3438* (2013.01); *H04L 67/535* (2022.05)

(58) Field of Classification Search
  CPC .............. G06F 3/0482; G06F 3/04842; G06F 3/04886; G06F 11/3438; H04L 67/22
  See application file for complete search history.

(56) References Cited

U.S. PATENT DOCUMENTS

| | | | |
|---|---|---|---|
| 8,543,900 B1* | 9/2013 | Kent | H04L 67/02 715/205 |
| 8,943,440 B2* | 1/2015 | Adderton | G06F 40/134 715/835 |
| 9,292,171 B2* | 3/2016 | Li | G06F 3/0482 |
| 9,846,685 B2* | 12/2017 | Li | H04N 21/242 |

(Continued)

FOREIGN PATENT DOCUMENTS

| CA | 2917174 | 1/2015 |
|---|---|---|
| WO | WO 2018/212801 | 11/2018 |
| WO | WO 2022/023969 | 2/2022 |

OTHER PUBLICATIONS

International Search Report and the Written Opinion Dated Nov. 30, 2021 From the International Searching Authority Re. Application No. PCT/IB2021/056798 (15 Pages).

(Continued)

*Primary Examiner* — Jeremy L Stanley

(57) ABSTRACT

A method and a client device for dynamically replacing interactive content of a quick setting bar are disclosed. The method comprises: monitoring activity of a user on a terminal client and the terminal client state. Identifying content currently presented to the user. Selecting one or more graphical user interface elements to present on the quick setting bar. The one or more graphical user interface elements have been selected based on a content list acquired from a storage according to data and a user profile calculated based on the user activity and terminal client state. Moreover, this comprises updating the quick setting bar to display the one or more graphical user interface elements while the currently presented content is displayed by a presentation unit of the terminal client.

20 Claims, 5 Drawing Sheets

(56) References Cited

U.S. PATENT DOCUMENTS

| | | | | |
|---|---|---|---|---|
| 9,874,989 | B1* | 1/2018 | Lewis | G06Q 30/0631 |
| 10,091,322 | B2* | 10/2018 | O'Donoghue | G06F 9/4451 |
| 10,621,223 | B2* | 4/2020 | Yellin | H04N 21/472 |
| 10,623,451 | B2* | 4/2020 | Rathod | H04L 65/4061 |
| 2009/0259957 | A1* | 10/2009 | Slocum | H04N 21/488 |
| | | | | 715/765 |
| 2012/0005016 | A1* | 1/2012 | Graff | G06Q 30/0251 |
| | | | | 705/14.49 |
| 2012/0005023 | A1* | 1/2012 | Graff | G06Q 30/0261 |
| | | | | 705/14.58 |
| 2012/0272261 | A1* | 10/2012 | Reynolds | H04N 21/25891 |
| | | | | 725/30 |
| 2013/0211910 | A1 | 8/2013 | Yerli | |
| 2013/0297704 | A1* | 11/2013 | Alberth, Jr. | H04M 3/42263 |
| | | | | 709/205 |
| 2014/0188335 | A1* | 7/2014 | Madhok | G06F 9/451 |
| | | | | 701/36 |
| 2014/0372866 | A1* | 12/2014 | Tidhar | G06F 40/14 |
| | | | | 715/234 |
| 2014/0372867 | A1* | 12/2014 | Tidhar | G06F 40/14 |
| | | | | 715/234 |
| 2015/0065170 | A1* | 3/2015 | Brisebois | H04W 4/023 |
| | | | | 455/456.3 |
| 2015/0143435 | A1* | 5/2015 | Kim | H04N 21/25891 |
| | | | | 725/86 |
| 2015/0185979 | A1 | 7/2015 | Zhang et al. | |
| 2015/0373147 | A1* | 12/2015 | Stuntebeck | H04L 67/327 |
| | | | | 707/734 |
| 2016/0012048 | A1* | 1/2016 | Yellin | H04N 21/4858 |
| | | | | 707/722 |
| 2016/0085763 | A1* | 3/2016 | Tatourian | G06F 8/62 |
| | | | | 707/662 |
| 2016/0098138 | A1* | 4/2016 | Park | H04N 5/232935 |
| | | | | 345/173 |
| 2016/0127485 | A1* | 5/2016 | Tseng | G06Q 50/01 |
| | | | | 709/205 |
| 2016/0189444 | A1* | 6/2016 | Madhok | G07C 5/02 |
| | | | | 701/36 |
| 2016/0371729 | A1* | 12/2016 | Glover | G06Q 30/0248 |
| 2017/0195550 | A1* | 7/2017 | Kim | H04N 5/2251 |
| 2017/0228127 | A1* | 8/2017 | Mukherjee | G06F 9/542 |
| 2017/0277396 | A1* | 9/2017 | Chung | G06F 9/451 |
| 2017/0366587 | A1* | 12/2017 | Sharifi | H04N 21/44209 |
| 2018/0083913 | A1* | 3/2018 | Ganesh | G06F 3/0484 |
| 2018/0088632 | A1* | 3/2018 | Dreessen | G06F 1/1673 |
| 2018/0164963 | A1* | 6/2018 | Ku | G06F 3/0483 |
| 2018/0188901 | A1* | 7/2018 | Shtuchkin | G06Q 10/10 |
| 2018/0192135 | A1* | 7/2018 | Sirpal | H04N 21/4668 |
| 2018/0225025 | A1* | 8/2018 | Rahnama | G06F 3/0482 |
| 2018/0241870 | A1* | 8/2018 | Mukherjee | G06F 3/0485 |
| 2018/0336010 | A1* | 11/2018 | Mukherjee | G10L 15/22 |
| 2019/0042071 | A1* | 2/2019 | Gandhi | H04L 67/22 |
| 2019/0104216 | A1* | 4/2019 | Van Hecke | G06F 3/0482 |
| 2019/0223229 | A1* | 7/2019 | Sharma | H04W 76/18 |
| 2019/0306098 | A1* | 10/2019 | Jang | H04L 67/1097 |
| 2019/0369842 | A1* | 12/2019 | Dolbakian | G06F 3/04886 |
| 2020/0065343 | A1* | 2/2020 | Morkovine | G06F 21/629 |
| 2020/0177699 | A1* | 6/2020 | Podduturi | G06Q 30/0256 |
| 2020/0196018 | A1* | 6/2020 | Burbank | H04N 21/47815 |
| 2020/0250230 | A1* | 8/2020 | Abhyankar | G06F 16/3344 |

OTHER PUBLICATIONS

International Preliminary Report on Patentability Feb. 9, 2023 From the International Bureau of WIPO Re. Application No. PCT/IB2021/056798. (7 Pages).

* cited by examiner

DYNAMICALLY REPLACING INTERACTIVE CONTENT OF A QUICK SETTING BAR

FIELD AND BACKGROUND OF THE INVENTION

The present invention, in some embodiments thereof, relates to presenting content in a computerized device and, more specifically, but not exclusively, to dynamically replacing interactive content of a quick setting bar.

Computerized devices usually contain a setting bar with definitions for operating the device. The setting bar is designed to be accessible and easy to manage and includes all the definitions that may be customized by a user for convenient use. In mobile devices, and specifically smartphones, the setting bar is defined to be a quick setting bar, which is very easily accessed usually by swiping down or up on a screen of the device. The quick setting bar usually contains graphical user interface elements accompanied by a short caption. For example: the sound definition is marked with a graphical element of a speaker accompanied by the caption sound.

SUMMARY OF THE INVENTION

It is an object of the present disclosure to describe a system and a method for dynamically replacing interactive content of a quick setting bar.

The foregoing and other objects are achieved by the features of the independent claims. Further implementation forms are apparent from the dependent claims, the description and the figures.

In one aspect, the present disclosure relates to a method for dynamically replacing interactive content of a quick setting bar, comprising:

monitoring user activity of a user on a terminal client and the terminal client state;

identifying content currently presented to the user;

selecting one or more graphical user interface elements to present on the quick setting bar, the one or more graphical user interface elements have been selected based on a content list acquired from a storage according to data and a user profile calculated based on the user activity and terminal client state; and updating the quick setting bar to display the one or more graphical user interface elements while the currently presented content is displayed by a presentation unit of the terminal client.

In a further implementation of the first aspect, the method further comprising:

receiving by a server data indicative of a currently presented content and monitored user activity from a terminal client;

providing instructions to present one or more graphical user interface elements on the quick setting bar, selecting the one or more graphical user interface elements based on data and a user profile calculated based on the user activity; and sending to the terminal client the instructions to present the one or more graphical user interface elements on the quick setting bar.

In a further implementation of the first aspect, the method further comprising accessing an Ad server system and retrieving a matched advertisement to be presented to the user, based on the user profile and the data calculated based on the user activity.

In a further implementation of the first aspect, the storage is a network storage.

In a further implementation of the first aspect, the storage is a local storage with content stored on the client device.

In a further implementation of the first aspect, the method further comprising: after updating the quick setting bar to display the one or more graphical user interface elements, receiving a user feedback, which directly changes the user profile and content recommendations.

In a further implementation of the first aspect, the terminal client state is based on network connectivity, cellular connection, non-cellular connection and network connection change of WiFi vs Long Term Evolution (LTE) and/or $5^{th}$ Generation technology standard for cellular networks (5G) and subsequent Generations.

In a further implementation of the first aspect, the terminal client state is based on available and/or unavailable cellular connection and available and/or unavailable non-cellular connection.

In a further implementation of the first aspect, the terminal client state is based on a battery level threshold.

In a further implementation of the first aspect, the terminal client state is based on a location trigger.

In a further implementation of the first aspect, the sending data indicative of the currently presented content to the server is done every predefined time interval.

In a further implementation of the first aspect, the sending data indicative of the currently presented content to the server is done at the server request.

In a further implementation of the first aspect, the user profile is calculated according to location per time of the terminal client.

In a further implementation of the first aspect, the user profile is calculated according to installed and uninstalled applications on the terminal client.

In a further implementation of the first aspect, the user profile is calculated according to applications running on the terminal client currently or at a predefined time window.

In a second aspect, the present disclosure relates to a terminal client for dynamically replacing interactive content in a quick setting bar, adapted to:

monitor user activity of a user on the terminal client and the terminal client state;

identify content currently presented to the user;

select one or more graphical user interface elements to present on the quick setting bar, the one or more graphical user interface elements have been selected based on a content list acquired from a storage according to data and a user profile calculated based on the user activity and terminal client state; and update the quick setting bar to display the one or more graphical user interface elements while the currently presented content is displayed by a presentation unit of the terminal client.

In a further implementation of the second aspect, the terminal client is further adapted to:

receive by a server data indicative of a currently presented content and monitored user activity from a terminal client;

provide instructions to present one or more graphical user interface elements on the quick setting bar, selecting the one or more graphical user interface elements based on data and a user profile calculated based on the user activity; and send to the terminal client the instructions to present the one or more graphical user interface elements on the quick setting bar.

In a third aspect, the present disclosure relates to a computer program product provided on a non-transitory computer readable storage medium storing instructions for performing a method for dynamically replacing interactive content of a quick setting bar, comprising:

monitoring user activity of a user on a terminal client and the terminal client state;

identifying content currently presented to the user;

selecting one or more graphical user interface elements to present on the quick setting bar, the one or more graphical user interface elements have been selected based on a content list acquired from a storage according to data and a user profile calculated based on the user activity and terminal client state; and updating the quick setting bar to display the one or more graphical user interface elements while the currently presented content is displayed by a presentation unit of the terminal client.

In a further implementation of the third aspect, performing the method for dynamically replacing interactive content of a quick setting bar, further comprising:

receiving by a server data indicative of a currently presented content and monitored user activity from a terminal client;

providing instructions to present one or more graphical user interface elements on the quick setting bar, selecting the one or more graphical user interface elements based on data and a user profile calculated based on the user activity; and sending to the terminal client the instructions to present the one or more graphical user interface elements on the quick setting bar.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
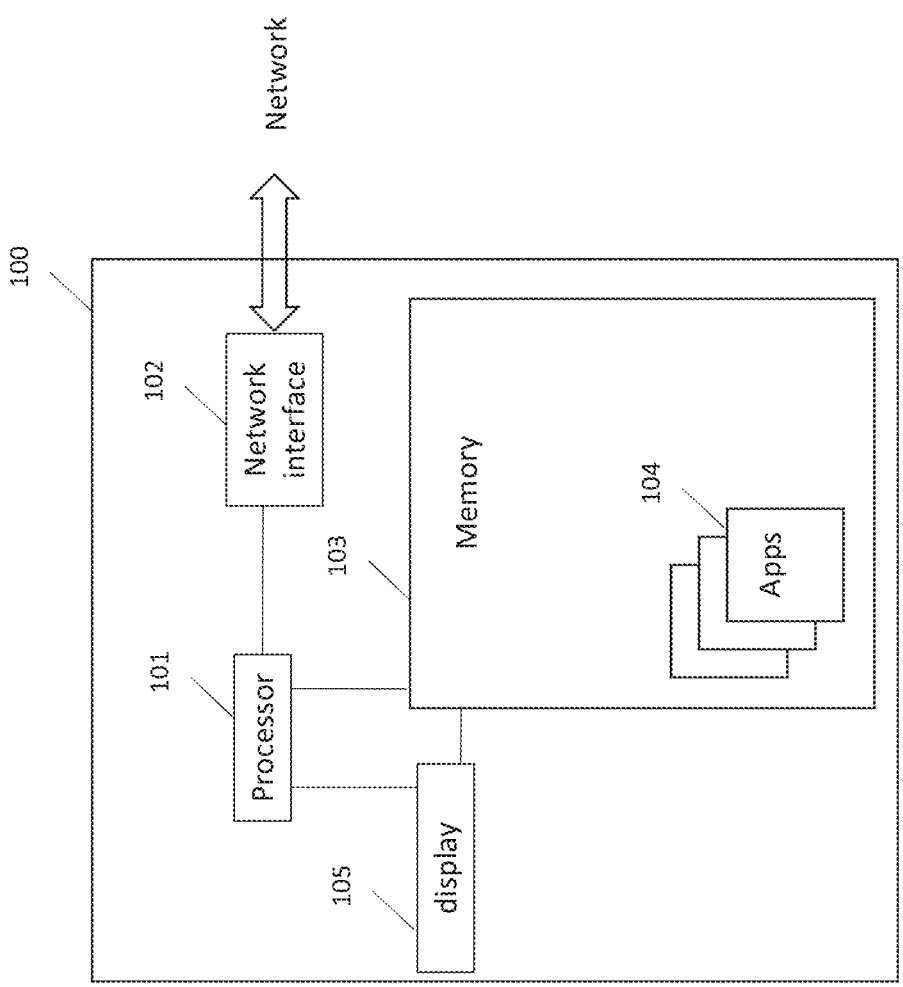
FIG. 1 is a schematic block diagram of a system for dynamically replacing interactive content in a quick setting bar, according to some embodiments of the present invention.

The present invention, in some embodiments thereof, relates to matching content in a computerized device and, more specifically, but not exclusively, to dynamically replacing interactive content of a quick setting bar.

An aspect of some embodiments of the present disclosure relates to systems and/or methods (e.g. code instructions stored in a network data storage device executed by one or more processors) that dynamically replaces user interface elements in the quick setting bar of a terminal client (also referred to as a client device) in accordance with the state of the terminal client and according to user activity.

In some embodiments of the present disclosure, a system for dynamically replacing interactive content of a quick setting bar, which monitors user activity of the user on a terminal client and the terminal client state is disclosed. The system identifies content currently presented to the user and selects one or more graphical user interface elements to present on the quick setting bar. The one or more graphical user interface elements, which are optionally interactive, are selected based on a content list acquired from a local storage, a remote storage or a remote service according to user related data and/or contextual data (e.g. device location, time of the day, currently or previously presented data, currently or previously executed application, currently or previously accessed website, currently or previously contacted contact persons and/or the like) and/or a user profile that is optionally calculated based on user activity and terminal client state(s). Then, the system updates the quick setting bar to display the one or more graphical user interface elements while the currently presented content is displayed by a presentation unit of the terminal client.

When a user uses his mobile device, he usually wishes to download or install useful applications (apps) that may serve him. The way to install a new application (app) is to access an application store such as the Google™ app store or Apple App Store™ in the mobile device, search for the correct app and install the app. However, this may require multiple actions and further disrupt the current user interface or interaction with the device. Additionally, occasionally the correct app or the relevant version of the app is not found. It is therefore desired to provide an accessible method to improve the speed, accuracy and usability of activating, downloading and installing applications.

In addition, it is desired to provide a device that can save users time by connecting them with apps, content, utilities and helping tools (with or without network connection) to save users time by surfacing contextual relevant information faster and/or easier.

The systems and/or methods described herein (implemented as code instructions stored in a data storage device executed by one or more processors), present a technical solution to the technical problem, whereby the speed, accuracy and usability of interactive elements facilitating activating, downloading and installing applications (apps) are improved by providing seamless contextual recommendations, which are based on the currently presented content. The contextual recommendations are also based on the current state of the client device.

Optionally, the client device may be a mobile device, a smartphone, a smart television, a computer, a laptop a tablet and any other computerized device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer and/or computerized device, partly on the user's computer and/or computerized device, as a stand-alone software package, partly on the user's computer (and/or computerized device) and partly on a remote computer or entirely on the remote computer or server. In the latter scenario, the remote computer may be connected to the user's computer and/or computerized device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified schematic block diagram of a network connected client device 100 with a display and a processor executing a code for dynamically adapting a quick setting bar presented on the display based on user activity, contextual data and state of the client device, according to some embodiments of the present disclosure. User activity may be any activity made by the user for example: currently or previously data the user accessed, currently or previously applications executed by the user, currently or previously accessed website, currently or previously contacted contact persons and/or the like. General contextual data may be the device location, time of the day and the like. The state of the client device may refer to the level of battery, the connectivity, cellular network and the like. The client device 100 includes one or more processor(s) 101, a network interface 102, a memory 103 hosting applications 104 (apps) installed on the client device and a display 105. The memory 103 is a non-transitory memory, which stores code instructions to be executed by the processor(s) 101. The network interface 102 used by the client device communicates with external elements such as a network storage, remote server or remote service over a network which provide content to the client device 100 at the client device requests or at any other predefined time period (intermittently, ad-hoc, scheduled or based on triggers of push and pull communication). The client device 100 comprises a client application executed by processor 101 which monitors user activity of a user on the client device. In addition, the client application executed by processor 101 of client device 100 monitors contextual data received from the sensors of the client device, such as a global positioning system sensor (GPS), an accelerometer, touch screen sensors and the like and data regarding the state of the client device. The client application of the client device 100 identifies content currently presented to the user, and calculates a user profile based on the user activity, the state of the client device and contextual data collected from the client device sensors and operation system such as location, time, state of the client device, statistics of the user activity on the client device (most heavily used apps and the like) and the like. Once the user profile is calculated, the processor 101 instructs the network interface 102 to interact with a network storage or a server to acquire a content list in accordance with the monitored activity of the user, currently presented content and the state of the client device. Once the content list is acquired, the client application of the client device 100 selects one or more graphical user interface elements to be presented in the quick setting bar of the display 105 of the device. The graphical user interface elements are optionally interactive and are selected based on the content list acquired from the network storage, according to the data and user profile calculated based on the user activity and the state of the device. The quick setting bar is updated to present the selected graphical user interface elements, while the currently presented content is displayed by a display 105 of the client device 100.

According to some embodiments of the present disclosure, the content list may be acquired from a local storage with content stored on the client device. For example, when there is no network connectivity, the content list is acquired from the local storage, which stores content that was saved locally on the client device.

According to some embodiments of the present disclosure, user activity may be the current or previous apps that have been used by the user or current web pages that the user accessed, or notifications currently presented to the user or contact persons contacted by the user and the like. The state of the client device may be referred to the level of the battery of the client device, the network connection type (Wifi or Long Term Evolution or fifth generation technology standard for cellular networks (5G) and subsequent Generations) of the device, changes in the network connection, network connectivity, cellular connection, non-cellular connection (for example Bluetooth connection and/or RFID) and connection unavailable. The state of the client device may also be referred to the location of the device and the time of the day, date and the like. For example: when the state of the client device indicates that there is no network connection, the client application of the client device may provide recommendations for activities that are available on the device and that do not require a network connection. For example, locally stored content within a game, podcast app, or news reader (some news readers are capable of downloading content for reading later—regardless whether network is available at the time of reading). Another example may be when a user insets into the battery category in the settings category of the definitions in his client device, the user may access the quick setting bar, which adjusts dynamically to list the top apps that have been using battery recently. Accessing the information of the top apps using battery recently, normally requires clicking deeper and deeper until the user gets the information, using the dynamically adaptive quick setting bar of the present disclosure, saves time and makes it easier for the user to get the information he wants.

According to some embodiments of the present disclosure, the user profile is generated according to applications running on the client device 100 currently or at a predefined time window. A time window, may be any time window such as a time of a day, date, day of week and the like.

According to some embodiments of the present disclosure, the network storage from which the client device 100 acquires the content list is a server. The server receives the user profile from the client device 100 and searches for content, which is in accordance with the user profile. The server may optionally provide instructions to present one or more graphical user interface elements on the quick setting bar, and may select the one or more graphical user interface elements based on data and the user profile calculated based on the user activity and the state of the client device. The server sends to the client device 100 the instructions to present the one or more graphical user interface elements on the quick setting bar of the display 105 of the client device 100.

According to some embodiments of the present disclosure, the server exposes a feed of available recommendations to the client device 100 intermittently, ad-hoc, scheduled, or based on triggers (push and pull communication). The client device 100 collects data and context information (local on the client device, current and historical) and matches the information to the available recommendations at regular intervals of time or based on contextual triggers. The client device 100 updates the quick setting bar to display the most recent recommendations based on the context of information on the device, the state of the device, and other applications and graphical user interface elements (GUI) that the user has interacted with.

Figure 2:
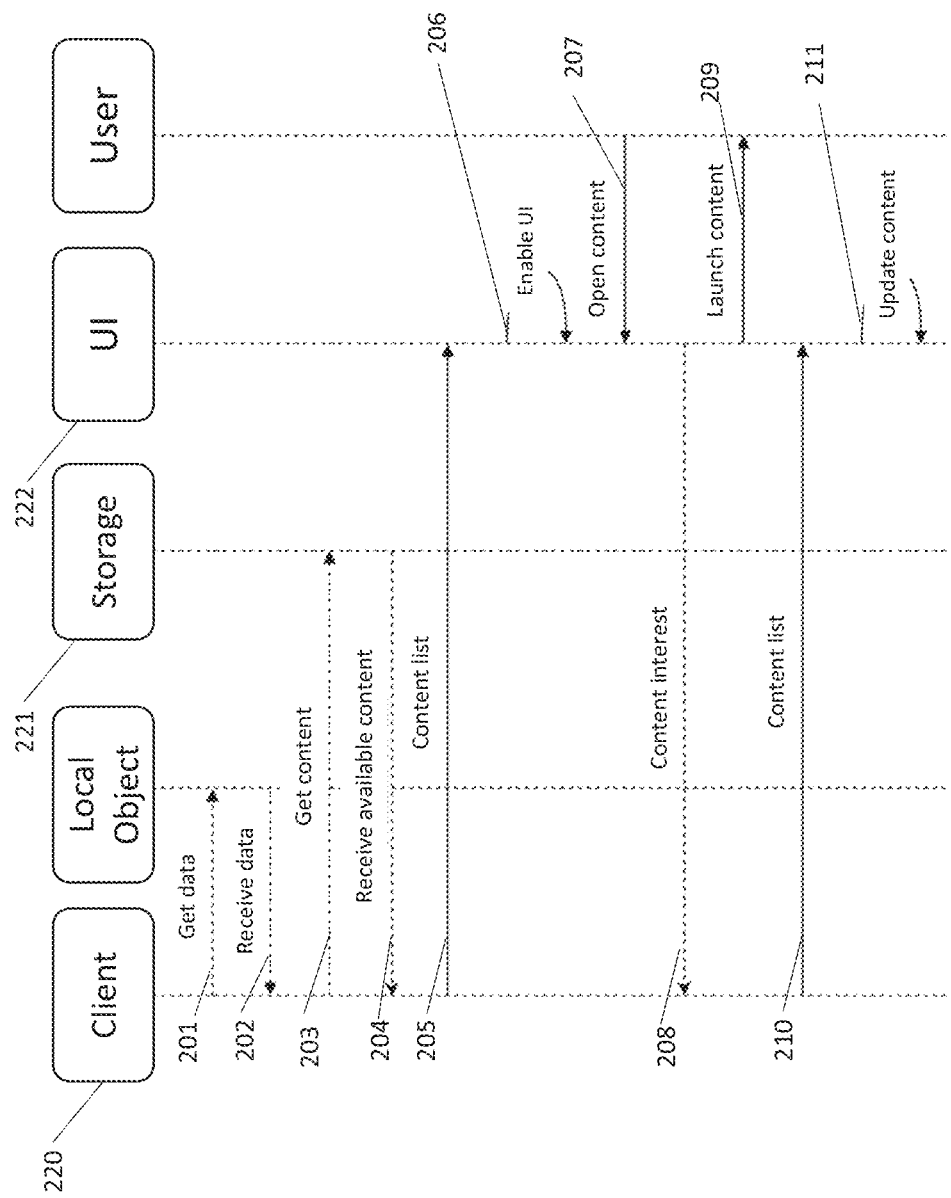
FIG. 2 is a sequence diagram describing the relationship between a client device, a network storage and a user interface, according to some embodiments of the present disclosure.

FIG. 2 schematically shows a sequence diagram describing the relationship between a client device 220, a network storage 221 and a user interface 222 from the client device side, according to some embodiments of the present disclosure. At 201, the client application of client device 220 monitors local objects 223 on the device, which represent the user activity and the state of the device to calculate a user profile. The local objects 223, may be the sensors of the client device such as the GPS sensor, the touch screen sensors, the accelerometer sensor, or the data collected about the user interaction with user interface elements on the display, apps executed by the user and the like. At 202 the data is received on the client device and the user profile is calculated. The user activity monitored may be the current activity the user has made, for example using a camera, a microphone, headphones and/or the currently or previously apps used by the user, most heavily used apps, contact persons the user contacted and the like. The content currently presented to the user is also analyzed by the client application of the client device to enable providing contextual recommendations of content for the use of the user. Optionally the content presented to the user may also be notifications presented to the user.

Once the user profile is calculated, at 203, the client application of the client device 220, sends to the network storage 221 the user profile and requests for available content, which is in accordance with the user profile and the currently presented content. At 204, the network storage 221 provides a content list with accordance to the user profile to the client application of the client device, and the client application of the client device 220 decides which of the content list is the most relevant to the use should be presented to the user as a recommendation. The client application of the client device 220 selects graphical user interface elements to be presented on the quick setting bar of the display of the device, which is also the user interface 222 and at 205, provide instructions to the display to present the selected graphical user interface elements in the quick setting bar. The display at 206, updates the quick setting bar to present the selected graphical user interface elements. Then, at 207, the user interacts with the user interface 222 and chooses to access one or more of the graphical user interface elements updated at the quick setting bar. The selection of the user is received at the client application of the client device 220 at 208, and analyzed to update the user profile and to update the recommendations for content provided to the user. At 209, after the user chooses a specific graphical user interface element, content is launched by the user interface 222 to the user, by linking to specific content within the app relevant to the graphical user interface element that was chosen, e.g., ten days forecast within a weather app. The client application of the client device 220 at 210 provides updated instructions to the display to present updated selected graphical user interface elements in the quick setting bar and at 211 the display updates the selection of graphical user interface elements and provides updated instructions for presenting the updated graphical user interface elements on the quick setting bar. The display receives the updated instructions and updates the quick setting bar to present the updated graphical user interface elements with the updated recommendations.

According to some embodiments of the present disclosure, the user may directly interact with the user interface 222 of the display and provide a feedback to directly influence the content recommendations and update triggers. For example: the user may provide feedback on a recommendation to increase or decrease the likelihood of seeing similar content in future recommendations. The user may block the recommendation, so that it never appears again. The user can pin the recommendation, so that it remains on the toolbar and the like.

According to some embodiments of the present disclosure, an example for monitoring user activity on the client device and providing relevant contextual recommendations for content may be identifying that the user used a camera, and providing in response a recommendation to use an application for editing photos and videos. In this case, the graphical user interface element presented to the user in the quick setting bar is the icon of the recommended app. Another example may be identifying by the client application of the client device a current app that is running in the foreground and/or background of the device, so in response the client application of the client device provides recommendations for displaying the icon of the identified app, sometimes with adaptations relevant to the app. For example if the app Spotify™ is displayed, while a song of a specific singer is played, the quick setting bar may display an icon linked to a website of the singer and/or to a social network account of the singer (Twitter™ feed, Facebook™ and the like), and/or an icon linked to a website with a review of the album of the played song (For example Pitchfork™ magazine review).

Another example for monitoring user activity on the client device and providing relevant contextual recommendations for content may be identifying a time and place where the user is available and providing recommendations for news, entertainment content or games. For example, when the location is identified as a train station, providing a recommendation for a game application.

According to some embodiments of the present disclosure, the contextual recommendations provided by the client application of the client device may relate to applications, which are not installed on the device. For example, when the client application of the client device monitors user activity and identifies that the user opened the web page a service which also has an app, the client device in response provides a recommendation to present the icon of the app of the service and when the user chooses to tap the graphical user interface (GUI) element of the presented app the application will be automatically installed on the client device and presented to the user. For example, if the user accessed the web page of Starbucks™ coffeehouse, and the client device location is in proximity to a Starbucks™ coffeeshop, the client device provides instruction to display the icon of Starbucks™ coffeehouse app in the quick setting bar, although the app is not installed on the device. If the user choses to tap the icon, the app will be automatically installed on the client device and so the app becomes available to the user immediately following download.

According to some embodiments of the present disclosure, the contextual recommendations provided by the client application of the client device may be related to the date, time of the day, day of week and/or month and/or any other specific time and the location. For example, when the hour is 11:30 AM and the client device location is at work, the client application of the client device provides instructions for recommendation of a food delivery app or a restaurant app. Another example may be at morning when the user leaves his house and goes to work, the client application of the client device monitors the hour and the change of location and according to the user profile the client application of the client device identifies the user usually drives to his work, therefore the client application of the client device provides instruction to display a navigation app in the quick setting bar.

According to some embodiments of the disclosure, the network storage providing content to the client device may be a server.

Figure 3:
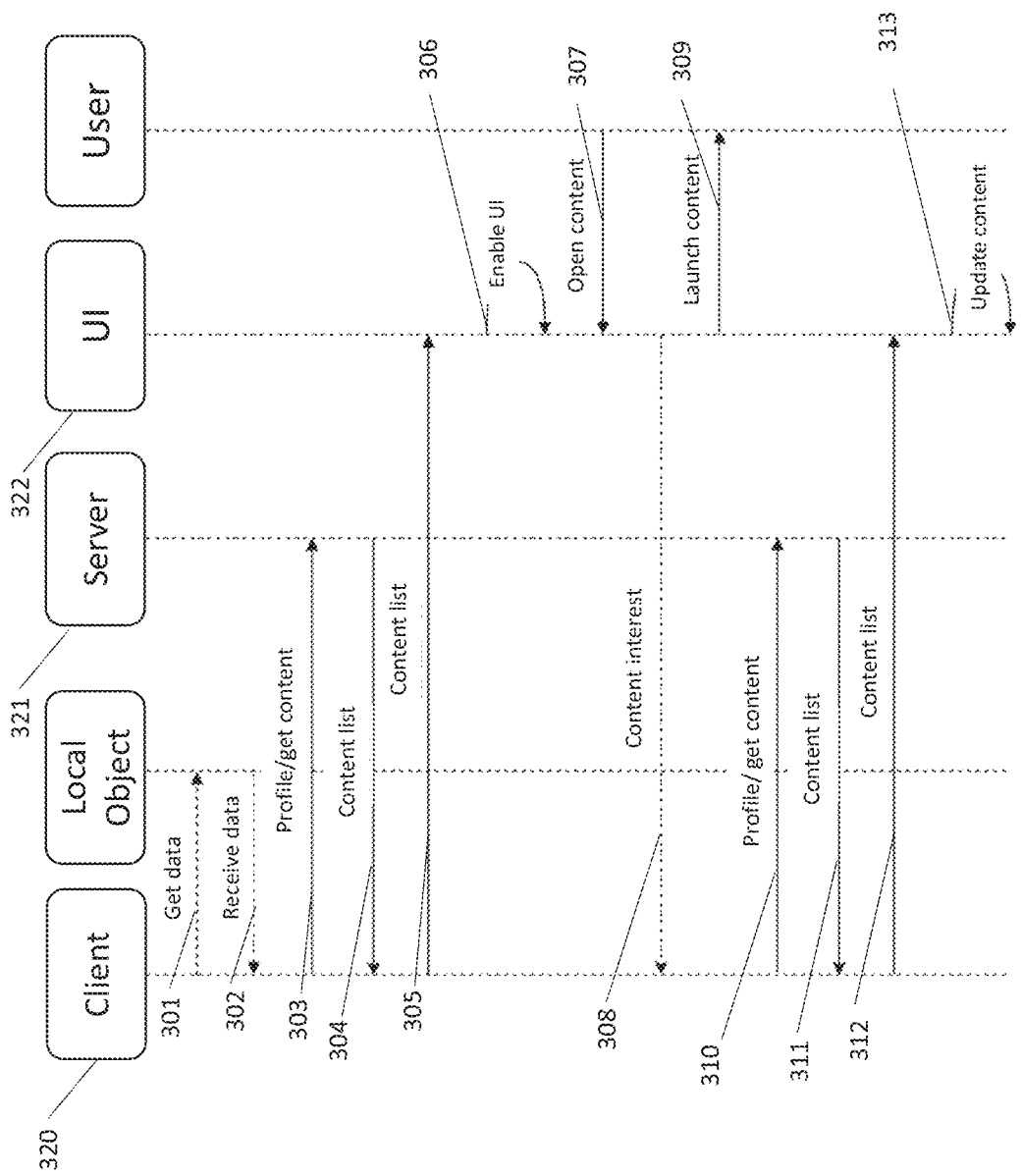
FIG. 3 schematically shows a sequence diagram of a system, which dynamically replaces interactive content in a quick setting bar, describing the relationship between a client device, a server and a user interface, according to some embodiments of the present disclosure.

FIG. 3 schematically shows a sequence diagram of a system, which dynamically replaces interactive content in a quick setting bar, describing the relationship between a client device 320, a server 321 and a user interface 322, according to some embodiments of the present disclosure. At 301, the client application of the client device 320 collects contextual information, and requests from local objects to send data and information about the user activity, the state of the client device and currently presented content. At 302, the data is sent from the local object/s to the client application of the client device 320 and the client application of the client device 320 calculates a user profile and at 303, sends the user profile to the server 321 at regular intervals, based on contextual triggers, or at the request of the server 321. The server 321 receives the user profile and the context information and matches criteria to available recommendations and selects one or more graphical user interface elements to be presented at the quick setting bar of the client device 320. The graphical user interface elements are selected based on the data and the user profile calculated based on the user activity. The server 321 sends the best matching recommendations to the client application of the client device 321 at 304. The client application of the client device provides at 305 instructions for presenting the selected graphical user interface elements at the quick setting bar. The display at 306 updates the quick setting bar, (and the user interface 322) to display to the most recent recommendations represented by the selected graphical user interface elements. At 307 the user interacts with the user interface 322 and chooses to access one or more of the graphical user interface elements updated at the quick setting bar. The selection of the user is received at the client device 320 at 308, and analyzed by the client application of the client device 320 to update the user profile and to update the recommendations for content provided to the user. At 309, after the user chooses a specific graphical user interface element, content is launched by the user interface 322 to the user, by linking to the app relevant to the graphical user interface element that was chosen. At 310, the client application of the client device 320 sends the updated user profile to the server to receive an updated content list with recommendations to be presented at the quick setting bar of the client device 320. The server 321 receives the updated user profile and the context information, and matches updated criteria to available recommendations and selects one or more updated graphical user interface elements to be presented at the quick setting bar of the client device 320. The graphical user interface elements are selected based on the updated data and the updated user profile calculated based on the user activity. The server 321 sends the updated best matching recommendations to the client device 320 at 311. The client application of the client device 320 at 312 provides updated instructions to the display to present updated selected graphical user interface elements in the quick setting bar and at 313 the display updates the selection of graphical user interface elements and provides updated instructions for presenting the updated graphical user interface elements on the quick setting bar and the user interface 322. The display receives the updated instructions and updates the quick setting bar and the user interface 322 to present the updated graphical user interface elements.

According to some embodiments of the present disclosure, the server exposes a feed of available recommendations to the client device intermittently, ad-hoc, scheduled, or based on triggers (push and pull communication). The client application of the client device collects context information (local on device, current and historical) and calculates a user profile and matches it to the available recommendations at regular intervals or based on contextual triggers. The client application of the client device updates the quick setting bar of the display (and the UI) to display the most recent recommendations based on the context of information on the device, the state of the client device, and other applications and GUI's that the user has interacted with.

In some embodiments of the present disclosure, the server accesses an Ad server system and retrieves a matched advertisement to be presented to the user, based on the user profile and the data calculated based on the user activity.

According to some embodiments of the present disclosure, the graphical user interface elements are updated at the quick setting bar using the permanent notification method where the graphical user interface elements are presented as permanent notification for providing content recommendations to the user based on contextual data and according to the user profile, state of the device and currently presented content.

Figure 4:
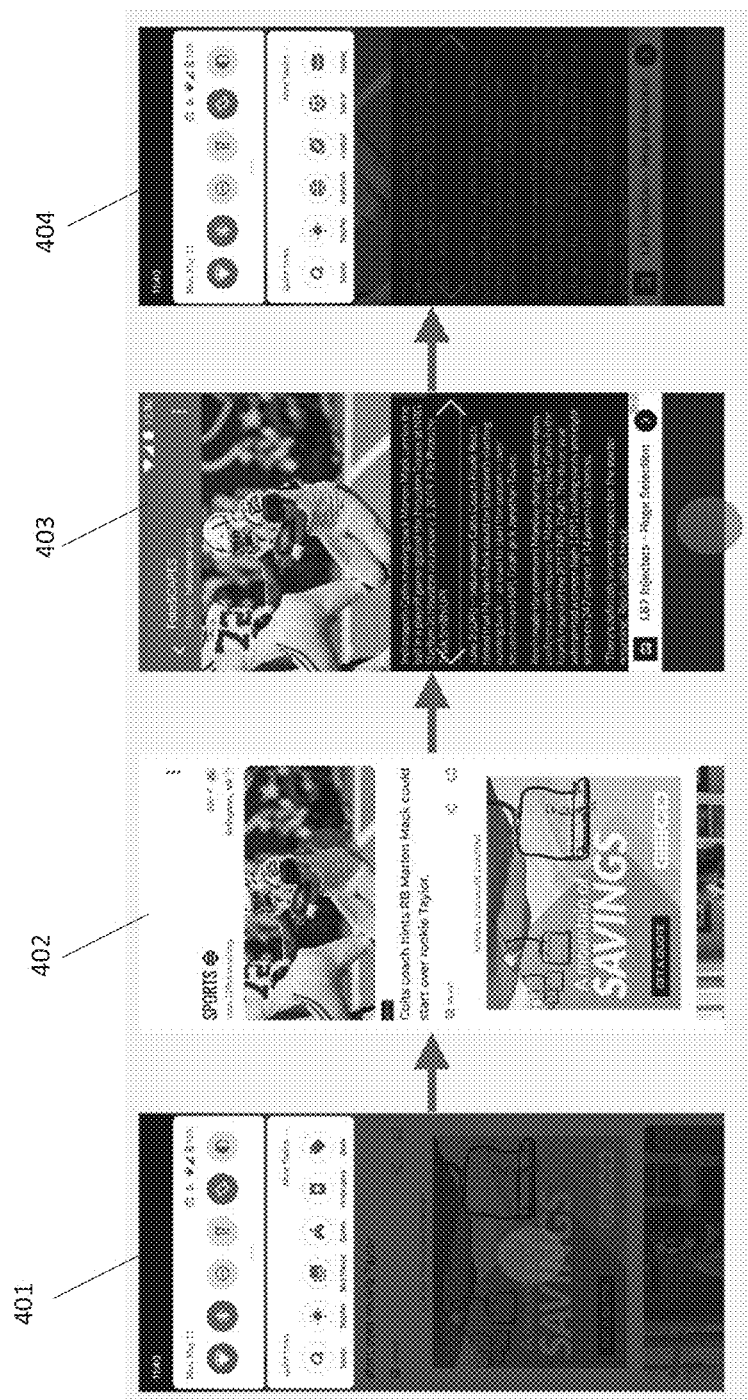
FIG. 4 schematically shows an example of screen shots of a client device quick tool bar, which is dynamically replaced and updated based on currently presented content, according to some embodiments of the present disclosure.

Reference is now made to FIG. 4, which presents an example of screen shots of a smartphone quick setting bar, which is dynamically replaced and updated based on currently presented content, according to some embodiments of the present disclosure. At 401 a quick setting bar of the smartphone is presented. In the quick setting bar there is a bar of graphical user interface elements which are quick links to applications for search, weather, photos, games, horoscopes and deals.

At 402, the user accesses a news and entertainment app, and at 403, the user chooses to watch content regarding a football game. The client device in this case is the smartphone, identifies the content currently presented to the user as related to sports in general and to football specifically, and therefore, in response the client application of the client device provides instruction for presenting graphical user interface elements related to sports in general and football specifically. The quick setting bat at 404 is updated to present the updated graphical user interface elements of: search, weather, basketball, football, soccer and hockey. According to some embodiments of the present disclosure, the client application of the client device (in this case, the client device is the smartphone) collects contextual data and identifies the content currently presented to the user, calculates a user profile and acquires from the network storage a content list relevant to the user profile and to the content currently presented to the user. The client application of the client device then, decides to provide instructions to the quick setting bar to present graphical user interface elements, based on the user profile calculated and the currently present content. The quick setting bar is updated and presents the selected graphical user interface elements while the currently presented content of football game article is displayed on the screen of the smartphone.

According to some embodiments of the present disclosure, the client application of the client device optionally sends the calculated user profile to a server, with a request to receive a content list and recommendations for content, which are based on the user profile, the state of the client device, the user activity and the currently presented content. Optionally the server searches for content, which is available and is in accordance with the user profile, state of the client device, user activity and currently presented content, and provides a content list with recommendations to the client device.

Figure 5:
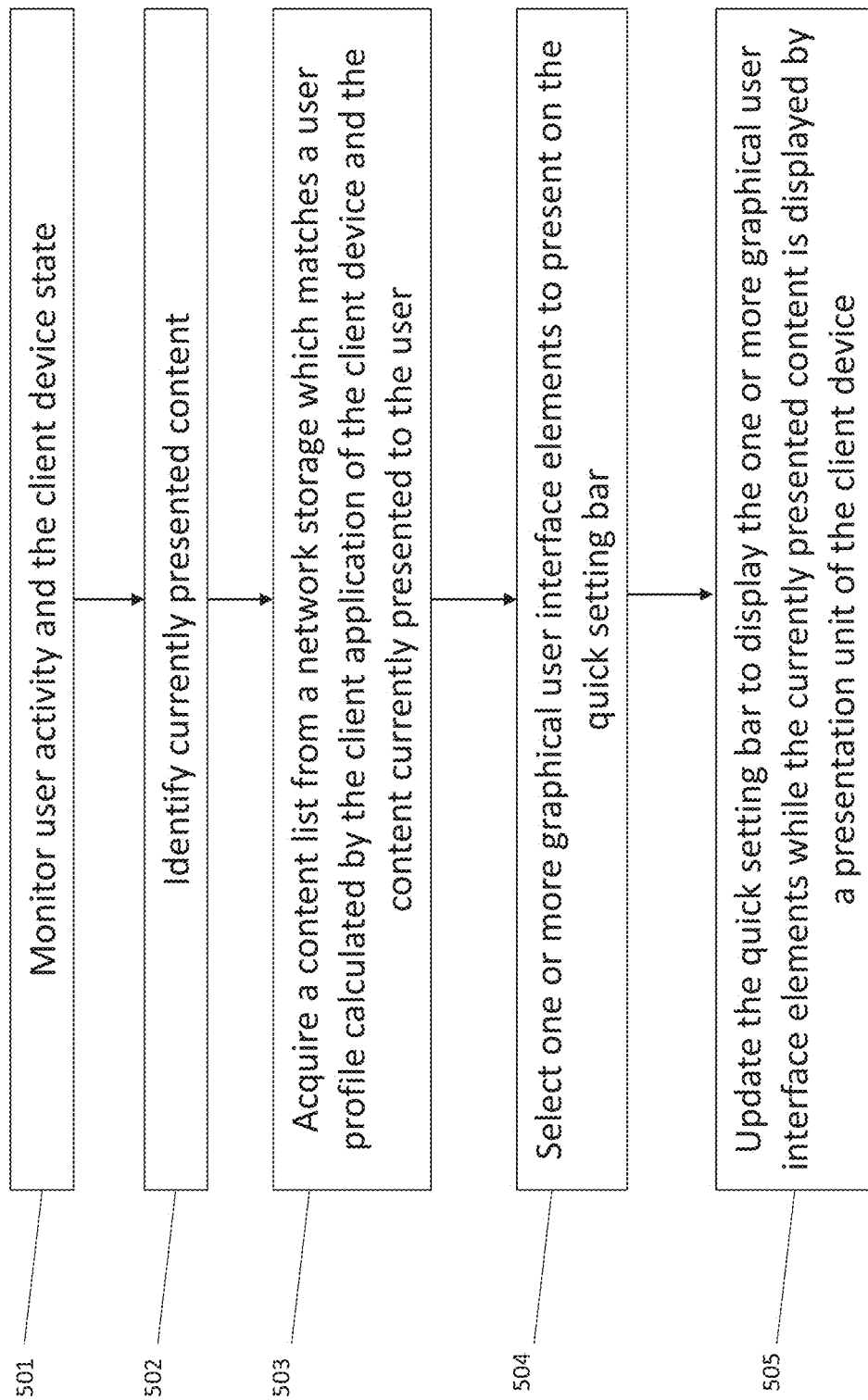
FIG. 5 schematically describes a method for dynamically replacing interactive content in a quick setting bar, according to some embodiments of the present disclosure.

FIG. 5 schematically describes a method for dynamically replacing interactive content in a quick setting bar, according to some embodiments of the present disclosure. At 501, user activity and the client device state are monitored by the client application of the client device. Contextual data regarding the client device is collected from local objects such as the sensors of the client device and information about user activity and currently presented content is identified by the client application of the client device at 502. A user profile is calculated according to the collected contextual data and monitored activity including calculation of behavior pattern recognizing constant activities that are repeated every day, depending on another contextual factor. Once the user profile is calculated, the client application of the client device accesses a network storage to acquire a content list at 503, which matches the user profile and the content currently presented to the user. The list of content is received by the client application of the client device at 504, which selects one or more graphical user interface elements to present on the quick setting bar. The one or more graphical user interface elements are selected based on a content list acquired from the network storage and according to the data and the user profile calculated based on the user activity and client device state. The client application of the client device then updates at 505, the quick setting bar to display the one or more graphical user interface elements while the currently presented content is displayed by a display of the client device. For example, the client application of the client device may monitor the user activity and identify that the user goes out of his house every morning between 7 AM to 8 AM to the train station, where he takes a train to his work. In response, the client application of the client device selects to present between 7 AM to 8 AM a graphical user interface element that links to the train app and shows the schedule for the next trains. Alternatively, the client application of the client device may identify that most of the time the user is at the train station or in the train, the user activates a music app and listens to music. Therefore, the client application of the client device selects to present a graphical user interface of the music app, which links to the music app used by the user.

The client application of the client device may also recommend installing apps which may be useful to the user and are not installed on the device.

Optionally, the network storage is a server, which exposes a feed of available recommendations to the client device intermittently, ad-hoc, scheduled, or based on triggers (push and pull communication). In this case, context information (local on device, current and historical) are collected by the client application of the client device and a user profile is calculated and matched to the available recommendations at regular intervals of times or based on contextual triggers. The quick setting bar of the display (and the UI) is updated by the client application of the client device to display the most recent recommendations based on the context of information on the device, the state of the client device, and other applications and GUI's that the user has interacted with.

Optionally, the user may directly interact with the user interface of the display and provide a feedback to directly influence the content recommendations and update triggers.

According to some embodiments of the present disclosure, there is provided a computer program product provided on a non-transitory computer readable storage medium storing instructions for performing a method for dynamically replacing interactive content of a quick setting bar, comprising: monitoring user activity of a user on a terminal client and the terminal client state; identifying content currently presented to the user; selecting one or more graphical user interface elements to present on the quick setting bar, the one or more graphical user interface elements have been selected based on a content list acquired from a network storage according to data and a user profile calculated based on the user activity and terminal client state; and updating the quick setting bar to display the one or more graphical user interface elements while the currently presented content is displayed by a display of the terminal client.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for dynamically replacing interactive content of a quick setting bar will be developed and the scope of the term methods and systems for dynamically replacing interactive content of a quick setting bar is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for dynamically replacing interactive content of a hidden quick setting bar, comprising:

monitoring user activity of a user on a terminal client and the terminal client state;

acquiring a current terminal client state;

calculating a user profile based on the user activity and said acquired current terminal client state and further based on installed applications on the terminal client and based on uninstalled applications on the terminal client;

identifying content currently presented to the user on a display of said terminal client; selecting one or more graphical user interface elements to be presented on the quick setting bar, said selection of the one or more graphical user interface elements is based on an acquired content list which matches the user profile and the identified content currently presented to the user and is further based on ability of respective elements of said acquired content list to operate under said acquired current state of the terminal client, said content list is acquired from a storage;

during said content being currently uninterruptedly presented to the user on said display by a presentation unit of the terminal client, updating the quick setting bar while said quick setting bar is not being displayed, said updating is conducted to include the one or more graphical user interface elements, such that only in response to a user operation for launching said quick setting bar, said one or more graphical user interface elements will be presented to the user in said launched quick setting bar; and dynamically adjusting said selection of said one or more graphical user interface elements according to dynamic changes in relevancy of information derivable from said one or more graphical user interface elements relevant to an active application currently being interacted by said user;

wherein said quick setting bar is displayed only following a launching operation of the quick setting bar, conducted by said user, as an overlaying display layer displayed over a displayed presentation being presented when said quick setting bar is launched.

2. The method of claim 1, further comprising:

receiving by a server data indicative of a currently presented content and monitored user activity from a terminal client;

providing instructions to respond to user operation to launch the quick setting bar by presenting one or more graphical user interface elements on the quick setting bar, the one or more graphical user interface elements are selected to be instructed to be presented, based on data and a user profile calculated based on the user activity and the identified content currently presented to the user; and sending to the terminal client the instructions to respond to user operation to launch the quick setting bar by presenting the one or more graphical user interface elements on the quick setting bar.

3. The method of claim 2, further comprising accessing an Ad server system and retrieving a matched advertisement to be presented to the user, based on the user profile and the data calculated based on the user activity.

4. A method according to claim 1, wherein the storage is a network storage.

5. A method according to claim 1, wherein the storage is a local storage with content stored on the client device.

6. A method according to claim 1, further comprising:

after updating the quick setting bar to include the one or more graphical user interface elements, receiving a user feedback, which directly changes the user profile and said content list.

7. The method according to claim 1, wherein the terminal client state is based on network connectivity, wherein said network connectivity is a member of a group consisting of: cellular connection, non-cellular connection and a change in network connection from a first network connectivity to a second network connectivity.

8. The method of claim 7, wherein said cellular network is a member of a group consisting of Long Term Evolution (LTE) and 5th Generation technology standard for cellular networks (5G).

9. The method according to claim 1, wherein the terminal client state is based on available and/or unavailable cellular connection and available and/or unavailable non-cellular connection.

10. The method according to claim 1, wherein the terminal client state is based on a battery level threshold.

11. The method according to claim 1, wherein the terminal client state is based on a location trigger.

12. The method according to claim 2, wherein sending said data indicative of the currently presented content to the server is done every predefined time interval.

13. The method according to claim 2, wherein sending said data indicative of the currently presented content to the server is done at the server request.

14. The method according to claim 1, wherein the user profile is calculated according to location per time of the terminal client.

15. The method according to claim 1, wherein the user profile is calculated according to applications running on the terminal client currently or at a predefined time window.

16. The method of claim 1, wherein said terminal client is selected from a group consisting of: a mobile device, a smartphone, a smart television, a computer, a laptop and a tablet.

17. A terminal client for dynamically replacing interactive content in a hidden quick setting bar, comprising at least one hardware processor adapted to:

monitor user activity of a user on the terminal client and the terminal client state;

acquire a current terminal client state;

calculate a user profile based on the user activity and said acquired current terminal client state and further based on installed applications on the terminal client and based on uninstalled applications on the terminal client;

identify content currently presented to the user on a display of said terminal client;

select one or more graphical user interface elements to be presented on the quick setting bar, said selection of the one or more graphical user interface elements is based on an acquired content list which matches the user profile and the identified content currently presented to the user and is further based on ability of respective elements of said acquired content list to operate under said acquired current state of the terminal client, said content list is acquired from a storage;

during said content being currently uninterruptedly presented to the user on said display by a presentation unit of the terminal client, update the quick setting bar while said quick setting bar is not being displayed, said updating is conducted to include the one or more graphical user interface elements, such that only in response to a user operation for launching said quick setting bar, said one or more graphical user interface elements will be presented to the user in said launched quick setting bar; and dynamically adjust said selection of said one or more graphical user interface elements according to dynamic changes in relevancy of information derivable from said one or more graphical user interface elements relevant to an active application currently being interacted by said user;

wherein said quick setting bar is displayed only following a launching operation of the quick setting bar, conducted by said user, as an overlaying display layer displayed over a displayed presentation being presented when said quick setting bar is launched.

18. The terminal client of claim 17, wherein said at least one hardware processor is further adapted to:
- receive by a server data indicative of a currently presented content and monitored user activity from a terminal client;
- provide instructions to respond to user operation to launch the quick setting bar by presenting one or more graphical user interface elements on the quick setting bar, the one or more graphical user interface elements are selected to be instructed to be presented, based on data and a user profile calculated based on the user activity and the identified content currently presented to the user; and
- send to the terminal client the instructions to respond to user operation to launch the quick setting bar by presenting the one or more graphical user interface elements on the quick setting bar.

19. A computer program product provided on a non-transitory computer readable storage medium storing instructions for performing a method for dynamically replacing interactive content of a hidden quick setting bar, comprising:
- monitoring user activity of a user on a terminal client and the terminal client state;
- acquiring a current terminal client state;
- calculating a user profile based on the user activity and said acquired terminal client state and further based on installed applications on the terminal client and based on uninstalled applications on the terminal client;
- identifying content currently presented to the user on a display of said terminal client;
- selecting one or more graphical user interface elements to be presented on the quick setting bar, said selection of the one or more graphical user interface elements is based on an acquired content list which matches the user profile and the identified content currently presented to the user and is further based on ability of respective elements of said acquired content list to operate under said acquired current state of the terminal client, said content list is acquired from a storage;
- during said content being currently uninterruptedly presented to the user on said display by a presentation unit of the terminal client, updating the quick setting bar while said quick setting bar is not being displayed, said updating is conducted to include the one or more graphical user interface elements, such that only in response to a user operation for launching said quick setting bar, said one or more graphical user interface elements will be presented to the user in said launched quick setting bar; and
- dynamically adjusting said selection of said one or more graphical user interface elements according to dynamic changes in relevancy of information derivable from said one or more graphical user interface elements relevant to an active application currently being interacted by said user;
- wherein said quick setting bar is displayed only following a launching operation of the quick setting bar, conducted by said user, as an overlaying display layer displayed over a displayed presentation being presented when said quick setting bar is launched.

20. The computer program product of claim 19, performing the method for dynamically replacing interactive content of a quick setting bar, further comprising:
- receiving by a server data indicative of a currently presented content and monitored user activity from a terminal client;
- providing instructions to respond to user operation to launch the quick setting bar by presenting one or more graphical user interface elements on the quick setting bar, the one or more graphical user interface elements are selected to be instructed to be presented, based on data and a user profile calculated based on the user activity and the identified content currently presented to the user; and
- sending to the terminal client the instructions to respond to user operation to launch the quick setting bar by presenting the one or more graphical user interface elements on the quick setting bar.

* * * * *